United States Patent Office 3,501,336
Patented Mar. 17, 1970

3,501,336
METHOD FOR ETCHING SINGLE CRYSTAL SILICON SUBSTRATES AND DEPOSITING SILICON THEREON

Lawrence D. Dyer and Ronald C. Bracken, Richardson, and Guy W. Taylor, Granite, Tex., assignors to Texas Instruments Incorporated, Dallas, Tex., a corporation of Delaware No Drawing. Filed Dec. 11, 1967, Ser. No. 689,289
Int. Cl. C23c *11/06*
U.S. Cl. 117—106 12 Claims

ABSTRACT OF THE DISCLOSURE

The method for hot vapor etching a single crystal silicon substrate including the steps of elevating the substrate to a temperature of about 1325° C. while being maintained in a hydrogen environment. After being elevated to temperature, the substrate is exposed for a period of from one-half to four minutes to a gaseous mixture containing hydrogen and 20 mole percent (based on the hydrogen) hydrogen chloride after which the substrate is again exposed to a relatively pure hydrogen atmosphere. After exposure to the relatively pure hydrogen atmosphere for one to thirty minutes, the substrate is again exposed to a gaseous mixture of hydrogen and 10 mole percent (based on the hydrogen) hydrogen chloride for a period of 15 minutes. Following the above etching steps, silicon may be deposited upon the subtrate by increasing the flow rate of the hydrogen stream and over a short period, for example five minutes, introducing into the stream a second stream containing hydrogen and trichlorosilane. The hydrogen chloride concentration is then reduced to about half its former concentration. Following reduction of the hydrogen chloride concentration, the temperature of the filament is lowered to about 1200° C. Silicon is then deposited upon the substrate for a period sufficient to produce a silicon rod of desired diameter. Before deposition is commenced by addition of the trichlorosilane, the second etching step which comprises passing the gaseous stream of hydrogen and 10 mole percent hydrogen chloride over the substrate, may be followed by yet further etching steps which include the flowing of a pure hydrogen stream over the substrate for a period of one to thirty minutes followed by again contacting the surface of the substrate with a hydrogen and 20 mole percent hydrogen chloride stream for a period of from one to four minutes after which the deposition steps as described above may be employed.

This invention relates to a method of producing single crystal silicon by vapor deposition techniques, and more particularly, to a method of hot vapor etching a single crystal silicon substrate and the method of depositing silicon upon said substrate after the etching steps.

The deposition of silicon on a single crystal substrate is a process well known in the semiconductor industry for obtaining high purity elementary silicon. If vapor deposition of silicon can be carried out so that a resulting silicon body is substantially single crystal and is in an amount that is commercially useful as a crystal ingot, several costly production steps can be eliminated from the process of making single crystal slices from the body. The single crystal slices are, of course, prepared for use as diodes, transistors and the like.

It is also known that the condition of the surface regions of the starting substrate is of prime importance in obtaining a satisfactory single crystal body following deposition of the silicon on the substrate. More particularly, certain defects including twins and polycrystalline nodules present on the surface of the starting substrate will result in defects of even larger magnitude on the finished silicon body, since, as the surface of the filament is built up, the defect will for certain important crystal directions tend to diverge and expand as the crystal grows. Since it is known that defects on the filament will result in defects in the finished body, various preliminary etching techniques have been tried to lower the number of defects present on the surface of the substrate.

Attempts have been made at etching the silicon substrate, while the substrate temperature is elevated to 1075° C. to 1350° C., by bypassing a relatively pure stream of hydrogen over the surface of the substrate. However, silicon substrates treated with the hydrogen etching technique have been found to contain numerous defects. The defects take various forms which are characterized by those skilled in the art as "twins," "dendtrites," and "polycrystalline nodules," but all types are discontinuities in the single crystal structure which renders that portion of the structure unsuitable for semiconductor applications. The etching techniques of the present invention are particularly advantageous in removing the dendrite defects, which, if permitted to persist, will lead to polycrystalline nodules.

Attempts have also been made at etching the silicon substrate with hydrogen halides, such as hydrogen chloride and hydrogen fluoride, see for example U.S. Patent No. 2,744,000. Efforts have been directed at etching silicon with a mixture of hydrogen and hydrogen chloride, U.S. Patent No. 3,243,323, as well as with mixtures of hydrogen and hydrogen bromide, Gregor, et al., IBM Journal (July 1965) pp. 327–332.

However, efforts directed to the etching of silicon substrates with a mixture containing 91% hydrogen and 9% hydrogen chloride, by volume, for periods of from 15 to 30 minutes in duration, while resulting in silicon substrates having fewer defects than those obtainable with hydrogen etching alone, still produced substrates having numerous defects.

There is disclosed in co-pending application Ser. No. 651,359 entitled "Hot Vapor Etching of Silicon Filaments for Improved Single Crystal Deposition" and assigned to the assignee hereof yet another etching technique. The etching technique described in the above application is an improvement over the prior art techniques and includes the steps of the positioning a single crystal substrate within an enclosure through which a gas may be passed for contact with the suprface of the substrate, elevating the temperature of the substrate to a temperature between about 1075° C. and the melting point of silicon, and passing a mixture of hydrogen gas and hydrogen halides gas through the enclosure for etching of the substrate after the substrate has been elevated in temperature. The improvement in the etching technique results from passing the gaseous mixture of hydrogen and from 5 to 30 mole percent hydrogen halide (based on the hydrogen) past the filament for a period of from about one to two minutes while the filament is being maintained at the elevated temperature.

The etching technique disclosed in application Ser. No. 651,359, while an improvement over prior art techniques, will nevertheless not remove all defects from the surface of the silicon substrate.

The present invention may be generally described as a method of hot vapor etching a single crystal silicon substrate which includes the steps of positioning the substrate within an enclosure through which a gas may be passed for contact with the surface of the substrate, elevating the temperature of the substrate to a temperature about 1075° C. and 1350° C., passing a mixture of hydrogen halide and hydrogen gas past said substrate for a period of from about one-half to five minutes while said substrate is being maintained between 1075° C. and the melting point of silicon, the concentration of said hydrogen halide in said mixture being between about 20 and 30 mole percent (based on said hydrogen); and passing relatively pure hydrogen past said filament for a period in excess of one minute after terminating the flow of the hydrogen halide and hydrogen mixture and while said filament is maintained at said elevated temperature. In addition to the above steps, the present invention includes the steps of flowing a gaseous mixture of hydrogen and from about 5 to 15 mole percent hydrogen halide (based on said hydrogen) over the substrate for a period of from 5 to 30 minutes. To be more particular, reference is here made to the following examples. Examples I, II, and III refer to testing all but the multiple "burst" treatment, while Examples IV and V refer to testing the additional hydrogen chloride treatment.

EXAMPLE I

An 8-inch single crystal silicon filament approximately ¼ inch in diameter was suspended between water cooled graphite electrodes positioned along the longitudinal axis of an approximately 1¾ inch I.D. cylindrical quartz enclosure fitted with suitable end plates having inlet and exhaust ports for gases. The filament was a "grown" silicon filament having its longitudinal axis oriented in the [111] direction. The temperature of the filament, after purging of the enclosure with hydrogen, was raised to about 1300° C. by passing a 60 cycle current through the filament in the conventional manner. After the filament had reached 1300° C., 10 liters per minute of hydrogen were circulated through the enclosure. After the hydrogen had been circulated over the filament for a period of 11 minutes, a flow of two liters per minute of hydrogen chloride gas was introduced into the hydrogen stream prior to its entry into the enclosure bringing the total gas flow through the enclosure to 12 liters per minute. The hydrogen chloride and hydrogen mixture was circulated over the filament for one minute, after which the hydrogen chloride flow was terminated. Ten liters per minute of hydrogen continued to flow over the filament for an additional two minutes, at the end of which one liter of hydrogen chloride was introduced into the hydrogen stream bringing the total gas flow to 11 liters per minute. The gaseous mixture containing a 1:10 hydrogen chloride to hydrogen ratio was passed over the filament for a period of 15 minutes.

After the filament had been etched as described above, the hydrogen flow rate was increased to 17 liters per minute, and over a five minute period a hydrogen stream containing trichlorosilane was gradually added to the first hydrogen stream to bring the total flow rate to 31 liters per minute, 4 percent (by volume) of which was trichlorosilane, and 1 liter per minute of which was hydrogen chloride. After one minute at the 31 liter per minute flow rate, the hydrogen chloride flow rate was gradually reduced to 500 cc. per minute over a one minute period. After expiration of another minute the temperature of the filament was lowered to 1250° C. over a two minute period. The gaseous stream of hydrogen, hydrogen chloride and trichlorosilane was circulated over the filament for a period of 10 minutes. At the end of this period, the hydrogen chloride flow rate was reduced to 250 cc. per minute for an additional 10 minute period, at the end of which hydrogen chloride flow rate was dropped to 125 cc. per minute for an additional 10 minutes. Thus over a 20 minute period following the etching steps, while the flow rate of the hydrogen and trichlorosilane were maintained at a constant rate, the hydrogen chloride concentration was dropped at 10 minute intervals from 500 cc. per minute to 125. The hydrogen chloride concentration in the gaseous stream was maintained at 125 cc. per minute for a period of 125 minutes until the deposition had been completed. The filament was cooled, removed from the reactor and the resulting silicon rod formed by the deposition of silicon on the filament was found to contain 10 polycrystalline nodule defects over the six inch length of the rod exposed to the gases (one inch at either end of the rod being clamped within the electrodes).

EXAMPLE II

The procedure of Example I was repeated for the same periods of time, and the silicon rod formed by the deposition was found to contain 18 defects over the six inch length exposed to the gases in the enclosure.

EXAMPLE III

The procedure of Example I was repeated, except the temperature of the filament during the deposition period was maintained at 1200° C. rather than 1250° C. and the deposition period of 165 minutes. The resulting silicon rod was found to contain 21 defects along the six inch length exposed to the gases within the enclosure.

EXAMPLE IV

The procedure of Example I was followed through the etching steps. The filament was further etched by terminating the hydrogen chloride flow and passing the 10 liters per minute of relatively pure hydrogen over the filament for one minute.

Then, following the hydrogen treatment, two liters per minute of hydrogen chloride were introduced into the hydrogen stream bringing the total gas flow into the enclosure to 12 liters per minute which flow rate was maintained for 1 minute.

To test the etching procedure, silicon was deposited upon the filament by the following procedure. The hydrogen chloride flow rate was reduced to one liter perminute and the hydrogen flow rate was simultaneously increased to 17 liters per minute. The gaseous stream containing the 17 liters per minute hydrogen and 1 liter per minute hydrogen chloride was permitted to flow over the filament for approximately one minute. A stream containing hydrogen and trichlorosilane was then introduced into the main gas stream bringing the total gas flow to 31 liters per minute, 4 percent (by volume) of which was trichlorosilane, and the gas stream so constituted was permitted to flow over the filament for one minute. On the expiration of the one minute period, the hydrogen chloride flow rate was reduced to 500 cc. per minute over a one minute period.

The gaseous stream flowing at the rate of 30.5 liters per minute was permitted to flow over the filament for a period of one minute following which the temperature of the filament was reduced to 1200° C. Silicon was then deposited on the filament for 129 minutes. The rod formed during the deposition procedure was removed and found to contain 2 dendritic defects (which are known to lead to polycrystalline nodules) over the six inch length exposed to the gaseous stream.

EXAMPLE V

The procedure of Example IV was followed, except that following the etching steps of Example IV, the hydrogen chloride flow rate was terminated and relatively pure hydrogen at the rate of 10 liters per minute was circulated over the filament for one minute after which two liters per minute of hydrogen chloride were introduced into the hydrogen stream for a period of one minute. Then silicon was deposited on the filament by the deposition procedure of Example IV.

The rod formed by the deposition technique was found to be completely free of dendritic defects.

The etching procedures of Example I consist essentially of subjecting the filament, after initial purging of the reactor with hydrogen, to a short "burst" of a hydrogen stream containing a relatively high concentration of hydrogen chloride, i.e., a 2:10 ratio of hydrogen chloride to hydrogen in the gas stream. The duration of this "burst" may vary between about one-half minute and 5 minutes, and the concentration of the hydrogen chloride between about 20 and 30 mole percent. Following the burst and the flushing of the enclosure with pure hydrogen, the filament is subjected to a relatively lengthy exposure to a hydrogen chloride stream in which the hydrogen chloride to hydrogen ratio is only 1:10. The length of the second exposure may vary from about five to thirty minutes and the concentration of the hydrogen chloride in the gaseous stream between 5 and 15%.

The etching technique of Example IV differs from that of Example I only in that following the lengthy exposure step of Example I, the filament, after flushing of the enclosure with hydrogen, is again exposed to another "burst" of the hydrogen and hydrogen chloride gaseous streams. The duration of this burst can again vary between about one-half and five minutes and the hydrogen chloride concentration between 20 and 30 mole percent (based on the hydrogen), as noted above in describing the first "burst." The procedure of Example V then adds a third burst of a stream containing a high concentration of hydrogen chloride, and procedures employing three or more burst may be employed if dendritic defects continue to remain after initial etching treatments.

Following both the above etching techniques, and the introduction of trichlorosilanes into the stream, it has been found desirable to gradually reduce the hydrogen chloride concentration in the gaseous hydrogen and trichlorosilane stream to achieve a desirable deposition.

What is claimed is:

1. A method of hot vapor etching a single crystal silicon substrate which includes the steps of (e1) positioning the substrate within an enclosure through which a gas may be passed for contact with the surface of the substrate (e2) purging the enclosure with hydrogen and elevating the temperature of the substrate to a temperature between about 1075° C. and the melting point of silicon, (e3) passing a mixture of hydrogen halide and hydrogen past said substrate for a period of from about one-half to five minutes while said substrate is being maintained between 1075° C. and the melting point of silicon, the hydrogen halide to hydrogen ratio in said mixture being between 2:10 and 3:10.

(e4) passing relatively pure hydrogen past said substrate for a period in excess of one minute after terminating the flow of the hydrogen halide and hydrogen mixture and while said substrate is maintained at said elevated temperature, and (e5) then flowing a gaseous mixture of hydrogen and from about 5 to 15 mole percent hydrogen halide, based on said hydrogen, over the substrate for a period of from 5 to 30 minutes.

2. The method of claim 1, wherein said hydrogen halide is hydrogen chloride.

3. The method of claim 2, wherein said hydrogen chloride concentration in said gaseous mixture during step (e5) is about 10 mole percent and said period in step (e5) is about 15 minutes.

4. The method of claim 3, wherein said substrate is maintained at about 1325° C. during said etching steps (e3) through (e5).

5. The method of claim 1, wherein said substrate is maintained at about 1325° C. during said etching steps (e3) through (e5).

6. The etching method of claim 1, followed by the deposition steps comprising:

(d1) increasing the flow rate of hydrogen in said mixture of hydrogen and hydrogen halide;

(d2) adding trichlorosilane to said mixture in a concentration between about 2 and 10 mole percent (based on said hydrogen);

(d3) reducing the hydrogen halide concentration to less than about 2.0 percent (based on said hydrogen); and (d4) reducing the temperature of said substrate to about 1250° C.

7. The method of claim 6, wherein said hydrogen halide is hydrogen chloride.

8. The method of claim 7, wherein the flow rate of said gaseous stream through said enclosure in step (d3) is approximately twice the flow rate of the gaseous stream in step (e5).

9. The ething method of claim 1, including the additional steps of:

(e6) then passing hydrogen over said substrate for a period of from about 1 to 5 minutes; and (e7) then passing a mixture of hydrogen and from about 20 to 30 mole percent (based on said hydrogen) of a hydrogen halide over said substrate for a period of from about one-half to five minutes.

10. The etching method of claim 9, wherein said hydrogen halide is hydrogen chloride.

11. The etching method of claim 10, followed by the deposition steps, comprising:

(d5) increasing the flow rate of hydrogen in said mixture of hydrogen and hydrogen helide;

(d6) adding trichlorosilane to said mixture in a concentration between 2 and 10 mole percent (based on said hydrogen);

(d7) reducing the hydrogen chloride concentration to less than about 2.0 percent (based on said hydrogen); and (d8) reducing the temperature of said substrate to about 1250° C.

12. The method of claim 11, wherein the flow rate of said stream of step (d7) is about twice that of the flow rate of the stream of step (e7).

References Cited

UNITED STATES PATENTS 3,370,995 2/1968 Lowery et al. ______ 117—106 X
3,243,323 3/1966 Corrigan et al. _______ 148—175

ALFRED L. LEAVITT, Primary Examiner

W. E. BALL, Assistant Examiner

U.S. Cl. X.R.

148—175; 156—17